United States Patent [19]

Mashita et al.

[11] Patent Number: 4,849,476
[45] Date of Patent: Jul. 18, 1989

[54] THERMOPLASTIC RESIN COMPOSITION

[75] Inventors: Kentaro Mashita; Jinsho Nambu, both of Chiba; Shoji Ishii, Mie, all of Japan

[73] Assignee: Sumitomo Chemical Co., Ltd., Japan

[21] Appl. No.: 15,468

[22] Filed: Feb. 17, 1987

[30] Foreign Application Priority Data

Feb. 15, 1986 [JP] Japan ................................ 61-31287
Dec. 19, 1986 [JP] Japan ............................... 61-304823

[51] Int. Cl.$^4$ ............................................ C08L 77/00
[52] U.S. Cl. .................................... 525/183; 525/178
[58] Field of Search ...................... 525/183, 184, 178

[56] References Cited

U.S. PATENT DOCUMENTS 4,554,320 11/1985 Reimann et al. .................... 525/183

FOREIGN PATENT DOCUMENTS 0180302 7/1986 European Pat. Off. .
3443959 6/1986 Fed. Rep. of Germany ...... 525/183
3444096 6/1986 Fed. Rep. of Germany ...... 525/183
2580656 10/1986 France .
0219257 11/1985 Japan .................................... 525/183

OTHER PUBLICATIONS

European Search Report EP 87 30 1236 (1988).

*Primary Examiner*—John C. Bleutge
*Assistant Examiner*—A. Carrillo
*Attorney, Agent, or Firm*—Sughrue, Mion, Zinn, Macpeak & Seas

[57] ABSTRACT

A flexible thermoplastic resin composition is disclosed comprising (A) from 5 to 59 parts by weight of a polyamide resin and (B) from 95 to 41 parts by weight of an ethylene copolymer containing (a) from 50 to 90% by weight of ethylene, (b) from 5 to 49% by weight of an $\alpha,\beta$-unsaturated carboxylic acid alkyl ester, and (c) from 0.5 to 10% by weight of maleic anhydride. The resin composition of the invention has excellent cold resistance, particularly impact strength at low temperatures, and an excellent balance between rubbery elasticity and rigidity in addition to excellent thermal resistance, abrasion resistance, and chemical resistance.

6 Claims, No Drawings

THERMOPLASTIC RESIN COMPOSITION

FIELD OF THE INVENTION

This invention relates to a novel flexible thermoplastic resin composition comprising a polyamide resin and an ethylene copolymer which is flexible an tough over a wide temperature range and is useful for production of sound-proof gears, sport shoe soles, tubes, hoses, etc. More specifically, it relates to a thermoplastic resin composition which comprises a polyamide resin and an ethylene copolymer containing an acid anhydride group and has an excellent balance of properties, a superior appearance, and high flexibility.

BACKGROUND OF THE INVENTION

Soft vinyl chloride resins, ethylene/vinyl acetate resins, thermoplastic urethane resins, nylon 12, etc. have hitherto been used as materials which give hard rubbery or leather-like molded articles. They, however, have certain properties which still require improvements, for example, cold resistance in the soft vinyl chloride resins and nylon 12, abrasion resistance in the ethylene/vinyl acetate resins, and moldability in the thermoplastic urethane resins. These properties constitute a setback in exploiting their utility.

As described in Japanese Patent Publication No. 22468/1981, a polyamide-based elastomer having moderate rigidity and flexibility can be obtained by mixing a polyamide resin and an ionic ethylene copolymer. This polyamide-based elastomer has relatively improved cold resistance, particularly impact strength at low temperatures, in addition to thermal resistance and abrasion resistance which the polyamide resins inherently possess, but the improvements are still not sufficient. Moreover, it has poor rubbery elasticity of its high rigidity.

SUMMARY OF THE INVENTION

It is an object of this invention to solve this problem by applying an ethylene copolymer composed of specific components and to provide a thermoplastic resin composition having excellent cold resistance, particularly impact strength at low temperatures, and an excellent balance between rubbery elasticity and rigidity in addition to excellent thermal resistance, abrasion resistance, and chemical resistance which are the characteristic properties of a polyamide-based elastomer.

The present inventors have extensively and elaborately researched and studied an ethylene copolymer which can be effectively mixed with a polyamide resin and have now found that an ethylene copolymer having specific components to be described hereunder has excellent thermal resistance, abrasion resistance, chemical resistance, cold resistance, particularly impact strength at low temperatures, and rubbery elasticity/rigidity balance. This discovery has led to the present invention.

According to this invention, there is provided a thermoplastic resin composition comprising:

(A) from 5 to 59 parts by weight of a polyamide resin; and (B) from 95 to 41 parts by weight of an ethylene copolymer comprising (a) from 50 to 90% by weight of ethylene, (b) from 5 to 49% by weight of an $\alpha,\beta$-unsaturated carboxylic acid alkyl ester, and (c) from 0.5 to 10% by weight of maleic anhydride.

DETAILED DESCRIPTION OF THE INVENTION

Various polyamides obtained by polycondensation of lactams having a ring with at least three members, polymerizable w-laurolactam, and 12-aminododecanoic acid, specifically polyamide 6, polyamide 11, and polyamide 12.

There can also be used polymers obtained by polycondensation of diamines (such as hexamethylenediamine, nonamethylenediamine, undecamethylenediamine, dodecamethylenediamine, and m-xylylenediamine) and dicarboxylic acids (such as terephthalic acid, isophthalic acid, adipic acid, sebacic acid, dodecanedibasic acid, and glutaric acid). Examples include aliphatic polyamide resins such as polyamide 6.6, polyamide 6.10, and polyamide 6.12; and aromatic polyamide resins such as poly(hexamethylenediamine terephthalamide), poly(hexamethylene isophthalamide), and xylene group-containing polyamides.

Other examples include polyamide (6, 6.6, 11) obtained by copolymerizing e-caprolactam, hexamethylenediamine, adipic acid, and 11-aminoundecanoic acid; and polyaminde (6, 6.6, 12) obtained by copolymerizing $\epsilon$-caprolactam, hexamethylenediamine, adipic acid, and 12-aminododecanoic acid or $\omega$-laurolactam.

Among the above polyamides, polyamide 6, polyamide 6.6, polyamide 12, and polyamide (6, 6.6, 12) are preferred.

The thermoplastic resin composition of this invention contains from 5 to 59 parts by weight, preferably from 10 to 55 parts by weight, of at least one polyamide resin selected from the above-exemplified polyamide resins as the polyamide resin (A). If the amount of the polyamide resin (A) is less than 5 parts by weight, the resulting composition does not have sufficient thermal resistance and abrasion resistance. If it exceeds 59 parts by weight, favorable results cannot be obtained in regard to cold resistance, particularly impact strength and flexibility at low temperatures.

The ethylene copolymer (B) as the other essential component of the composition of this invention is composed of, as monomer components, (a) ethylene, (b) an $\alpha,\beta$-unsaturated carboxylic acid alkyl ester, and (c) maleic anhydride. The proportion of ethylene (a) is from 50 to 90% by weight, preferably from 60 to 85% by weight. The proportion of the $\alpha,\beta$-unsaturated carboxylic acid alkyl ester (b) is from 5 to 49% by weight, preferably from 7 to 45% by weight. The proportion of maleic anhydride (c) is from 0.5 to 10% by weight, preferably from 1 to 8% by weight.

The $\alpha,\beta$-unsaturated carboxylic acid alkyl ester (b) is an alkyl ester of an unsaturated carboxylic acid having from 3 to 8 carbon atoms such as acrylic acid and methacrylic acid. Specific examples include methyl acrylate, ethyl acrylate, n-propyl acrylate, isopropyl acrylate, n-butyl acrylate, t-butyl acrylate, isobutyl acrylate, methyl methacrylate, ethyl methacrylate, n-propyl methacrylate, isopropyl methacrylate, n-butyl methacrylate, and isobutyl methacrylate. Of these, methyl acrylate, ethyl acrylate, n butyl acrylate, and methyl methacrylate are preferred.

The ethylene copolymer (B) also includes ethylene copolymers obtained by copolymerizing the above components with other copolymerizable monomers such as vinyl acetate and vinyl propionate in amounts which do not impair the desired properties of the final composition.

If the proportion of ethylene (a) in the ethylene copolymer (B) is less than 50% by weight, favorable results cannot be obtained in regard to cold resistance, especially impact strength at low temperatures, and moldability when processed into a composition with the polyamide resin (A). If it exceeds 95% by weight, compatibility with the polyamide resin (A) is reduced, which results in adversely affecting the impact strength and the appearance of a molded article. If the proportion of the $\alpha,\beta$-unsaturated carboxylic acid alkyl ester (b), is less than 5% by weight or exceeds 49% by weight, favorable results cannot be obtained in regard to cold resistance, especially impact strength at low temperatures. If the proportion of maleic anhydride (c) is less than 0.5% by weight or exceeds 10% by weight, the cold resistance, particularly impact strength at low temperatures, is reduced, and the moldability and the appearance of a molded article are adversely affected.

The ethylene copolymer (B) has a melt index (as defined in JIS K6760) of from 0.1 to 200 g/10 minutes, preferably from 0.5 to 100 g/10 minutes. If the melt index is less than 0.1 g/10 minutes, the moldability and the uniformity in appearance of a molded article are reduced. If it exceeds 200 g/10 minutes, the mechanical properties are reduced undesirably.

As required, the resin composition of this invention may further contain a reinforcing agent or filler such as glass fibers, calcium carbonate, clay, silica, and carbon black, an improver such as ethylene carbonate, propylene carbonate, propylene oxide, butylene oxide, glycerol, stearyl monoglyceride, and polyethylene glycol, or a plasticizer. Sometimes, it is preferable to use the composition as a composite composition further containing other additives such as a heat stabilizer, an ultraviolet light absorber, a dye, or a pigment.

There is no particular restriction on the method of producing the resin composition of this invention, and conventional methods can be used. From an industrial standpoint, kneading the required components in the molten state is preferred.

General kneading apparatus such as a Banbury mixer, extruders, rolls, and kneaders may be used in performing the melt kneading. Prior to the kneading, it is preferred to mix the resin components in the form of a powder or pellets uniformly by such a device as a tumbling mixer or a Henschel mixer. If required, the mixing may be omitted, and the resin components may be fed in fixed quantities separately to the kneading apparatus.

The kneaded resin composition is molded by various molding methods such as injection molding and extrusion molding. It is also within the scope of this invention to use a method by which without the prekneading step, the resin components are dry blended at the time of injection molding or extrusion molding and directly kneaded and molded during the melting and processing operations.

The following examples illustrate the present invention more specifically. It should be understood, however, that the invention is not limited to these examples.

In these examples, various properties were measured by the following methods.
Flexural modulus
JIS K7203 (thickness: 2 mm)
Tensile strength and elongation at break
JIS K6301 (thickness: 2 mm)
Izod impact strength (notched)
JIS K7110 (thickness: 4 mm, measuring temperature: $-40°$ C.)
Vicat softening point
ASTM D1525
Permanent elongation
JIS K6301
Melt index
JIS K6760 (190° C, 2,160 g)

In the following Examples and Comparative Examples, the following polyamide resins and polyethylene or ethylene copolymers were used.

(A) Polyamide resins:
UBE Nylon ® 1013B (polyamide 6) manufactured by Ube Industries, Ltd.
UBE Nylon ® 2020B (polyamide 6.6) manufactured by Ube Industries, Ltd.
Platamid ® H005 (polyamide (6, 6.6, 12) copolymer) manufactured by Nihon Rilsan K.K.

(B) Ethylene copolymers or polyethylene:
Bondine ® series ethylene copolymers mentioned below can be produced by the methods described in French Patent No. 1323379 and French Patent Application No. 81/01430.
Bondine ® AX8040 manufactured by Sumika CdF Chimie Company Limited. (E/EA/MAH=87.5/10/2.5% by weight, MI: 9 g/10 min.)
Bondine ® TX8030 manufactured by Sumika CdF Chimie Company Limited. (E/EA/MAH=87.5/10/2.5% by weight, MI: 4.4 g/10 min.)
Bondine ® AX8060 manufactured by Sumika CdF Chimie Company Limited. (E/EA/MAH=69.8/27.1/3.1% by weight, MI: 34 g/10 min.)
Acryft ® WA3036-04 manufactured by Sumitomo Chemical Co., Ltd. (E/MMA=70/30% by weight, MI: 5 g/10 min.
Hi.Milan ® AM6004 manufactured by Mitsui Polychemicals Co., Ltd. (E/MAA, Zn-MA=91/9% by weight, MI: 10 g/10 min.)
Sumikathen ® L-705 manufactured by Sumitomo Chemical Co., Ltd. (polyethylene, MI: 7 g/10 min.)
The above abbreviations have the following meanings:
E: ethylene
EA: ethyl acrylate
MAH: maleic anhydride
MMA: methyl methacrylate
MAA: methacrylic acid
Zn-MA: zinc methacrylate
MI: melt index

EXAMPLES 1 TO 8 AND COMPARATIVE EXAMPLES 1 3

In each run, the resin components indicated in Tables 1 and 2 were kneaded by a vent-equipped single-screw extruder having a screw diameter of 30 mm at a predetermined temperature (260° C when polyamide 6 was used; 280° C. when polyamide 6.6 was used; 260° C. in Examples 5 and 6). The mixture was dried and then molded by using a 3.5-ounce injection molding machine (Model FS75 (N) made by Nissei Plastic Industrial Co., Ltd.) to obtain test specimens for measurement of properties.

The results of the measurement are shown in Tables 1 and 2.

TABLE 1

| Example No. | Composition (wt %) Polyamide Resin (A) Polyamide | Polyamide 6.6 | Copolyamide | Ethylene Copolymer (B) | Flexural Modulus (kg/cm²) | At Break Tensile Strength (kg/cm²) | Elongation (%) | Izod Impact Strength (−40° C.) (notched) (kg·cm/cm) | Vicat Softening Point (°C.) | Permanent Elongation (%) |
|---|---|---|---|---|---|---|---|---|---|---|
| 1 | UBE Nylon 1013B 20 | — | — | Bondine AX8040 80 | 190 | 46 | 500 | NB | 40> | 13 |
| 2 | " 40 | — | — | " 60 | 520 | 78 | 225 | NB | 44 | 10 |
| 3 | " 20 | — | — | Bondine TX8030 80 | 1,110 | 132 | 275 | NB | 62 | 17 |
| 4 | " 40 | — | — | " 60 | 2,530 | 185 | 200 | NB | 80 | 13 |
| 5 | " 40 | — | Platamid H005 10 | Bondine AX8060 50 | 850 | 90 | 100 | NB | 41 | 12 |
| 6 | " 45 | — | " 10 | " 45 | 1,620 | 135 | 110 | NB | 44 | 10 |
| 7 | — | UBE Nylon 2020B 20 | — | Bondine AX8040 80 | 230 | 49 | 150 | NB | 40> | 14 |
| 8 | — | " 40 | — | " 60 | 690 | 87 | 150 | NB | 45 | 13 |

NB: no breakage

TABLE 2

| Comparative Example No. | Composition Polyamide Resin (A) (wt %) | Ethylene Copolymer (B) (wt %) | Flexural Modulus (kg/cm²) | At Break Tensile Strength (kg/cm²) | Elongation (%) | Izod Impact Strength (−40° C.) (notched) (kg/cm·/cm) | Vicat Softening Point (°C.) | Permanent Elongation (%) |
|---|---|---|---|---|---|---|---|---|
| 1 | UBE Nylon 1013B Polyamide 6 40 | Acryft WA3036-04 60 | 5,440 | 245 | 25 | 8.7 | 73 | broken |
| 2 | " 40 | Hi.Milan AM6004 60 | 5,930 | 235 | 100 | 15 | 87 | 20 |
| 3 | " 40 | Sumikathen L-705 60 | 9,030 | 277 | 0 | 5.7 | 103 | measurement impossible |

It is seen from the results obtained in Examples 1 to 8 that the resin compositions in accordance with this invention had excellent impact strength at low temperatures and good rubbery elasticity with an excellent elastic recovery and had a very good balance between rubbery elasticity and rigidity.

In Comparative Example 1, the resin composition caused phase separation in the molded article, and its appearance was not uniform. The impact strength of the article at low temperatures was insufficient.

In Comparative Example 2, the resin composition had good thermal resistance, and the uniformity of the appearance of the molded article was good (phase separation occurred within the article, however). But, it had high rigidity, poor flexibility, and insufficient impact strength at low temperatures.

In Comparative Example 3, the resin composition caused phase separation in the molded article as in the resin composition of Comparative Example 1, and the uniformity of its appearance was undesirable. Furthermore, the resin composition had insufficient impact resistance at low temperatures and poor rubbery elasticity and hence, was unsuitable as an elastomer.

As stated hereinabove, the thermoplastic resin composition according to this invention has good moldability and appearance and has a good balance in various properties of a molded article prepared therefrom. Thus, it can be understood that this invention gives rise to markedly superior effects.

The novel flexible resin composition provided by this invention can be easily fabricated into sheets and various articles by molding methods used for ordinary thermoplastic elastomers, such as injection molding and extrusion molding. The molded articles have excellent appearance uniformity and smoothness, and other properties such as flexibility, impact strength, and chemical resistance in a well-balanced combination.

While the invention has been described in detail and with reference to specific embodiments thereof, it will be apparent to one skilled in the art that various changes and modifications can be made therein without departing from the spirit and scope thereof.

What is claimed is:

1. A thermoplastic resin composition comprising:
   (A) from 10 to 55 parts by weight of a polyamide resin; and
   (B) from 90 to 45 parts by weight of ethylene copolymer comprising (a) from 50 to 90% by weight of ethylene, (b) from 5 to 49% by weight of an α,β-unsaturated carboxylic acid alkyl ester, and (c) from 0.5 to 10% by weight of maleic anhydride.

2. A composition of claim 1, wherein the polyamide resin (A) is at least one resin selected from polyamide 6, polyamide 6.6, and polyamide 12.

3. A composition of claim 1, wherein the ethylene copolymer (B) comprises from 60 to 85% by weight of ethylene (A), from 7 to 45% by weight of the α,β-unsaturated carboxylic acid in (b) has from 1 to 8% by weight of maleic anhydride (c).

4. A composition of claim 1, wherein the α,β-unsaturated carboxylic acid in (b) has from 3 to 8 carbon atoms.

5. A composition of claim 1, wherein the α,β-unsaturated carboxylic acid alkyl ester is selected from methyl acrylate, ethyl acrylate, n-butyl acrylate, and methyl methacrylate.

6. A composition of claim 1, wherein the ethylene copolymer (B) has a melt index of from 0.1 to 200 g/10 minutes.

* * * * *